US012154497B2

(12) United States Patent
Choi et al.

(10) Patent No.: US 12,154,497 B2
(45) Date of Patent: Nov. 26, 2024

(54) ELECTRONIC DEVICE INCLUDING POWER SUPPLY CIRCUIT

(71) Applicant: SAMSUNG ELECTRONICS CO., LTD., Suwon-si (KR)

(72) Inventors: Hangseok Choi, Suwon-si (KR); Sangwoo Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/392,495

(22) Filed: Dec. 21, 2023

(65) Prior Publication Data

US 2024/0135871 A1 Apr. 25, 2024

Related U.S. Application Data

(63) Continuation of application No. 17/992,291, filed on Nov. 22, 2022, now Pat. No. 11,893,931, which is a (Continued)

(30) Foreign Application Priority Data

Nov. 5, 2021 (KR) ........................ 10-2021-0151419
Dec. 14, 2021 (KR) ........................ 10-2021-0178745

(51) Int. Cl.
*G09G 3/3225* (2016.01)

(52) U.S. Cl.
CPC ..... *G09G 3/3225* (2013.01); *G09G 2330/028* (2013.01)

(58) Field of Classification Search
CPC ....................... G09G 2330/028; G09G 3/3225
See application file for complete search history.

(56) References Cited

U.S. PATENT DOCUMENTS 5,717,318 A * 2/1998 Matsuda ................. H02M 3/07 323/273
9,806,523 B2 * 10/2017 Stratakos .............. H02M 3/158
(Continued)

FOREIGN PATENT DOCUMENTS

KR 10-0696563 3/2007
KR 10-2010-0075130 7/2010
(Continued)

OTHER PUBLICATIONS

Search Report and Written Opinion dated Jan. 31, 2023 in International Patent Application No. PCT/KR2022/016902.
Choi et al., U.S. Appl. No. 17/992,291, filed Nov. 22, 2022.

*Primary Examiner* — Van N Chow
(74) *Attorney, Agent, or Firm* — Nixon & Vanderhye, P.C.

(57) ABSTRACT

An example electronic device including a power supply circuit may include a battery; a display module including a display panel; a regulator; a power supply circuit configured to: based on an input voltage of the battery, provide a first voltage and a second voltage to the display module, and provide a third voltage to the regulator; and a switch control circuit configured to: control a switching operation of the power supply circuit, wherein the power supply circuit includes: a first power circuit and a second power circuit, wherein the first power circuit includes multiple switch elements, a first capacitor, a second capacitor, a third capacitor, and a first inductor, and is configured to: for a first time interval, based on a drive signal of the switch control circuit, charge the first capacitor and the second capacitor, based on a current of the first inductor and discharge the third capacitor to provide a first output current to the display module, and for a second time interval, based on a drive signal of the switch control circuit, charge the third capacitor and discharge the first capacitor and the second capacitor to provide
(Continued)

the first output current and a second output current to the display module, and wherein the second power circuit is configured to: convert a voltage level of the input voltage of the battery to provide a second voltage to the display module.

13 Claims, 6 Drawing Sheets

Related U.S. Application Data continuation of application No. PCT/KR2022/016902, filed on Nov. 1, 2022.

(56) References Cited

U.S. PATENT DOCUMENTS

| | | | | |
|---|---|---|---|---|
| 10,090,756 | B1 * | 10/2018 | Tsai | H02M 1/36 |
| 10,516,334 | B1 | 12/2019 | He | |
| 10,972,083 | B2 | 4/2021 | Zhang et al. | |
| 11,030,961 | B2 | 6/2021 | Hong et al. | |
| 2005/0173615 | A1 | 8/2005 | Hontele | |
| 2006/0267973 | A1 | 11/2006 | Woo et al. | |
| 2010/0156873 | A1 | 6/2010 | Lee | |
| 2013/0162175 | A1 | 6/2013 | Kim | |
| 2015/0299391 | A1 | 10/2015 | Pacorel | |
| 2015/0339972 | A1 * | 11/2015 | Xu | G09G 3/32 345/206 |
| 2015/0366013 | A1 * | 12/2015 | Shrotriya | H05B 45/10 327/427 |
| 2021/0118348 | A1 | 4/2021 | Park et al. | |
| 2021/0312848 | A1 | 10/2021 | Lee | |

FOREIGN PATENT DOCUMENTS

| | | |
|---|---|---|
| KR | 10-0973815 | 7/2010 |
| KR | 10-1970551 | 4/2019 |
| KR | 10-2019-0101771 | 9/2019 |
| KR | 10-2020-0039266 | 4/2020 |
| KR | 10-2021-0086813 | 7/2021 |
| KR | 10-2021-0122932 | 10/2021 |

* cited by examiner

ELECTRONIC DEVICE INCLUDING POWER SUPPLY CIRCUIT

CROSS-REFERENCE TO RELATED APPLICATIONS

This application is a continuation of U.S. application Ser. No. 17/992,291, filed Nov. 22, 2022, which is a continuation of International Application No. PCT/KR2022/016902 designating the United States, filed on Nov. 1, 2022, in the Korean Intellectual Property Receiving Office and claiming priority to Korean Patent Application No. 10-2021-0151419, filed on Nov. 5, 2021, in the Korean Intellectual Property Office, and to Korean Patent Application No. 10-2021-0178745, filed on Dec. 14, 2021, in the Korean Intellectual Property Office, the disclosures of all of which are incorporated by reference herein in their entireties.

BACKGROUND

Field

The disclosure relates to an electronic device including a power supply circuit.

Description of Related Art

Organic light emitting devices display images using organic light emitting diodes, such as organic light emitting diodes (OLEDs) that generate light through recombination of an electron and a positive hole, and are in the spotlight for the advantages of operating with a low power consumption at a fast response speed, and exhibiting remarkable luminous efficiency, brightness, and viewing angles.

A recent trend of portable electronic devices is to employ OLEDs having a low power consumption for displays. Such a portable electronic device may use a converter to change the voltage of the battery and then provide a drive voltage to OLEDs, so as to drive the OLEDs.

The converter may be a three-level boost converter. A three-level boost converter is capable of reducing inductor size. However, current always flows through two switches (e.g., MOSFETs), and thus conduction loss may increase.

A three-level boost converter requires a separate circuit which performs balancing such that the voltage of a flying capacitor is always maintained as the half of an output voltage, and thus has a control circuit having an increased complexity.

A three-level boost converter generates only one output voltage as does a general (conventional) switching converter, and thus the electronic device requires an additional converter to supply power to a different element in the electronic device.

SUMMARY

Embodiments of the disclosure provide a control method and a device wherein only one switch element is allowed to be involved in an inductor current path of a three-level boost converter in an electronic device including the three-level boost converter.

Embodiments of the disclosure provide a control method and a device wherein the voltage of a flying capacitor of a three-level boost converter may be automatically initialized to be ½ of an output voltage every switching period in an electronic device including the three-level boost converter.

An electronic device including a power supply circuit according to an example embodiment of the disclosure may include: a battery; a display module including a display; a regulator; a power supply circuit configured to: based on an input voltage of the battery, provide a first voltage and a second voltage to the display module, and provide a third voltage to the regulator; and a switch control circuit configured to control a switching operation of the power supply circuit, wherein the power supply circuit includes a first power circuit and a second power circuit, wherein the first power circuit includes multiple switch elements, a first capacitor, a second capacitor, a third capacitor, and a first inductor, and is configured to: for a first time interval, based on a drive signal of the switch control circuit, charge the first capacitor and the second capacitor based on a current of the first inductor and discharge the third capacitor to provide a first output current to the display module, and for a second time interval, based on a drive signal of the switch control circuit, charge the third capacitor and discharge the first capacitor and the second capacitor to provide the first output current and a second output current to the display module, wherein the second power circuit is configured to convert a voltage level of the input voltage of the battery to provide a second voltage to the display module.

An electronic device including a power supply circuit according to various example embodiments of the disclosure may involve only one switch element in an inductor current path of a three-level boost converter so as to prevent and/or reduce power loss caused by a switch, which may occur upon generation of a drive voltage for OLEDS.

An electronic device including a power supply circuit according to various example embodiments of the disclosure may automatically initialize the voltage of a flying capacitor of a three-level boost converter to be ½ of an output voltage every switching period without addition of a flying capacitor balancing circuit, and thus has a simplified control circuit by excluding a balancing circuit for maintaining the voltage of the flying capacitor at ½ of the output voltage.

An electronic device including a power supply circuit according to various example embodiments of the disclosure may supply, without an additional converter and as the power of a different element in the electronic device, the voltage of a flying capacitor of a three-level boost converter, which is automatically initialized every switching period, and thus may exclude a switching converter for additional power generation.

BRIEF DESCRIPTION OF THE DRAWINGS

In relation to the description of drawings, the same or similar elements may be indicated by the same or similar reference signs. Further, the above and other aspects, features and advantages of certain embodiments of the present disclosure will be more apparent from the following detailed description, taken in conjunction with the accompanying drawings, in which.

DETAILED DESCRIPTION

Figure 1:
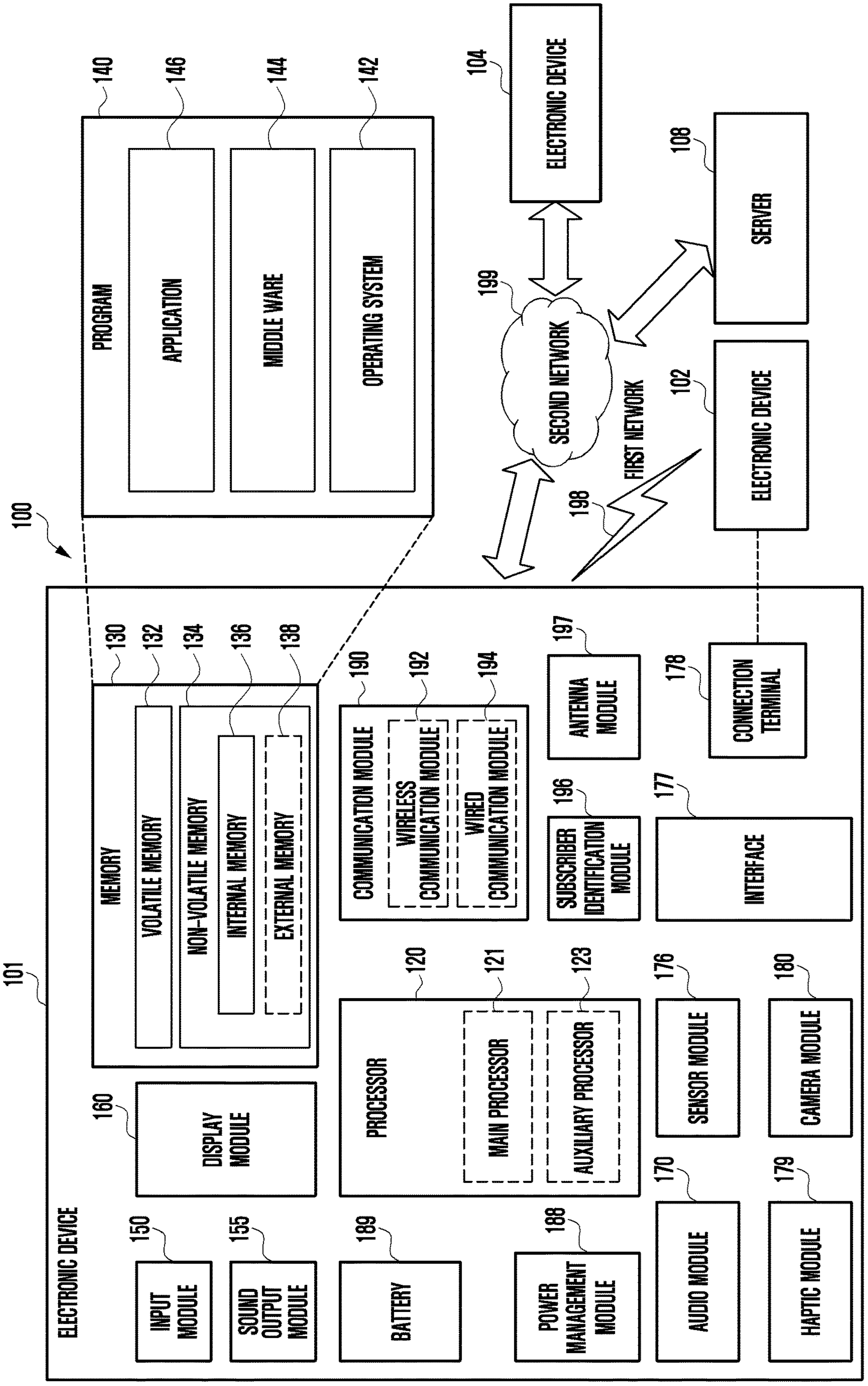
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
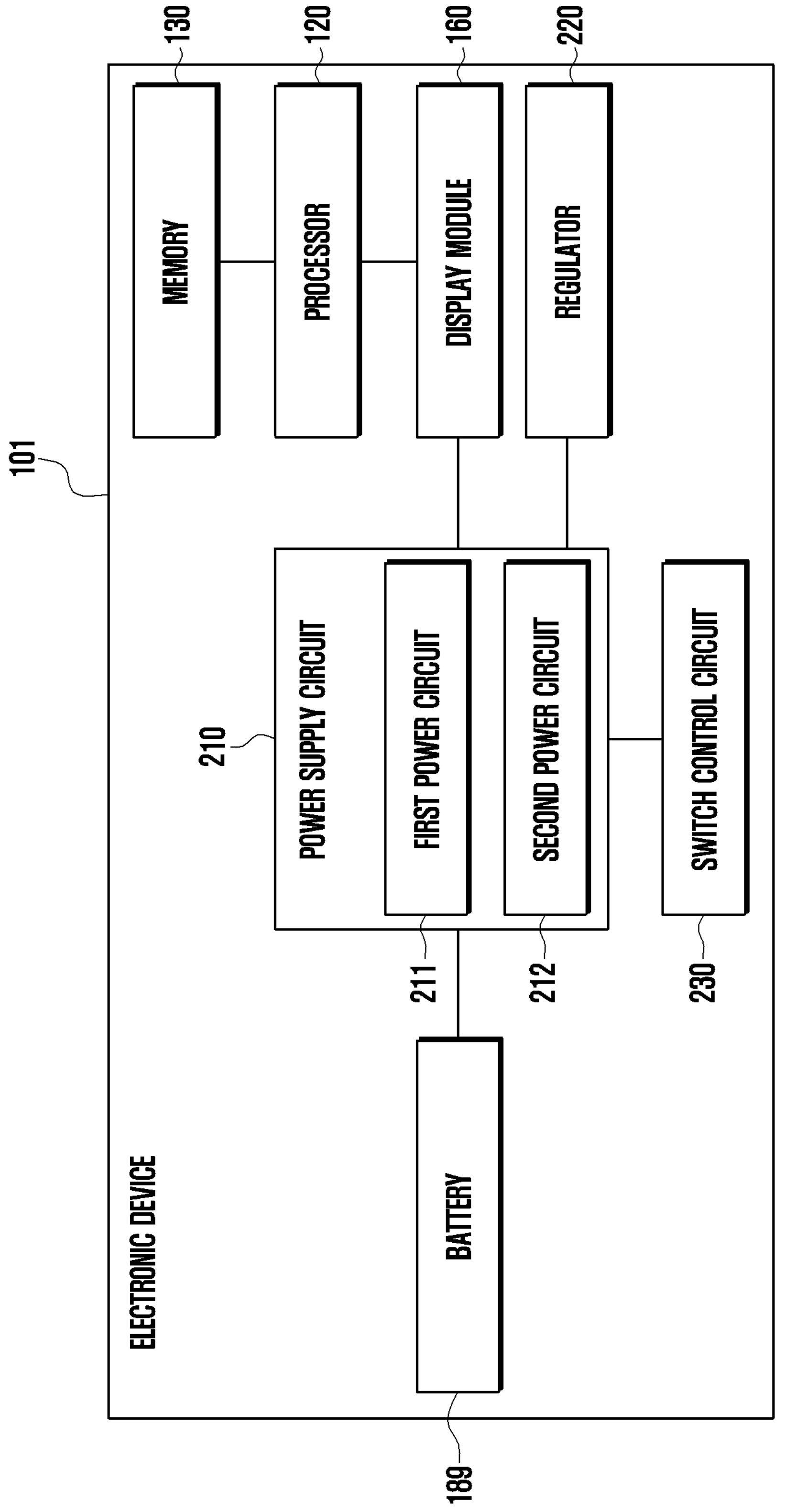
FIG. 2 is a block diagram illustrating an example configuration of an electronic device including a power supply circuit according to various embodiments.

FIG. 2 is a block diagram illustrating an example configuration of the electronic device 101 including a power supply circuit 210 according to various embodiments.

According to an embodiment, the electronic device 101 may include all or at least some of the elements of the electronic device 101 as described in the description given with reference to FIG. 1.

In an embodiment, the electronic device 101 may include a processor (e.g., including processing circuitry) 120, a memory 130, a display module (e.g., including a display) 160, a battery 189, the power supply circuit 210, a regulator 220, and/or a switch control circuit 230.

In an embodiment, the processor 120 may including various processing circuitry and control a signal transferred from the switch control circuit 230 to the power supply circuit 210. The processor 120 may control the display module 160 to display visual information to the outside of the electronic device 101.

In an embodiment, the processor 120 may control the switch control circuit 230, based on data related to an operation of a switch, which is stored in the memory 130.

In an embodiment, the memory 130 may store various data related to a power supply operation of the electronic device 101. The memory 130 may store data related to an operation of a switch included in the power supply circuit 210. For example, the data stored in the memory 130 may be data related to an operation of a switch included in the power supply circuit 210. The data related to an operation of a switch may include information of a duty cycle and/or a duty rate.

In an embodiment, the display module 160 may include, for example, an organic light emitting diode (OLED) panel.

The OLED panel may operate based on a drive voltage transferred from the power supply circuit 210. The drive voltage that the power supply circuit 210 supplies to the OLED device may include a first voltage ($V_1$) and a second voltage ($V_2$).

The first voltage ($V_1$) may supply a positive voltage to the OLED panel. The second voltage ($V_2$) may supply a negative voltage to the OLED panel.

The OLED panel may include a data line, a scan line, a switching transistor, a capacitor, a driving transistor, and an OLED element with respect to a pixel.

The scan line may be connected to a gate of the switching transistor. The data line may be connected to a source of the switching transistor. At least a part of the capacitor and a gate of the driving transistor may be connected to a drain of the switching transistor.

At least a part of the capacitor and the first voltage ($V_1$) may be connected to a source of the driving transistor. A drain of the driving transistor may be connected to an anode of the OLED.

The anode of the OLED element may be connected to the drain of the driving transistor, and a cathode thereof may be connected to the second voltage ($V_2$).

The OLED panel may store voltage data in the capacitor, and drive the OLED, based on the voltage data.

In an embodiment, when a signal transferred through the scan line is a low level, the switching transistor may be turned on, and the capacitor may be charged by a data signal transferred through the data line. A gate voltage of the driving transistor may be consistently maintained by the capacitor until a next scan operation, and a drive current may be generated by a gate-source voltage difference of the driving transistor. The OLED element may emit light, based on the drive current.

In an embodiment, the battery 189 may supply power to at least one element of the electronic device 101. In an embodiment, the battery 189 may include a battery protection circuit (e.g., a protection circuit module (PCM)). For example, the battery protection circuit may perform various functions (e.g., a pre-cutoff function) for prevention/reduction of performance degradation of or damage to the battery 189. The battery protection circuit may be additionally or alternatively configured as at least a part of a battery management system (BMS) for cell balancing, measurement of capacity, the number of times of charging/discharging, the temperature, or the voltage of the battery. According to an embodiment, the battery protection circuit may be measured using a corresponding sensor (e.g., a temperature sensor) of the sensor module 176. According to an embodiment, the corresponding sensor (e.g., a temperature sensor) of the sensor module 176 may be included as a part of the battery protection circuit, or may be disposed near the battery 189 as a separate device.

In an embodiment, the power supply circuit 210 may include a first power circuit 211 and a second power circuit 212.

In an embodiment, the power supply circuit 210 may provide, to the display module 160 or the regulator 220, multiple voltages generated by boosting and/or bucking a voltage, based on a power provided from the battery 189.

In an embodiment, the power supply circuit 210 may generate a first voltage ($V_1$), a second voltage ($V_2$), and a third voltage ($V_3$), based on a power provided from the battery 189.

In an embodiment, the power supply circuit 210 may provide the first voltage ($V_1$) and the second voltage ($V_2$) to the display module 160.

In an embodiment, the power supply circuit 210 may provide the third voltage ($V_3$) to the regulator 220.

In an embodiment, the first power circuit 211 may generate the first voltage ($V_1$) and the third voltage ($V_3$), by boosting and/or bucking a voltage, based on a power provided from the battery 189.

In an embodiment, the second power circuit 212 may boost or buck a voltage, based on a power provided from the battery 189 and then generate the inverted second voltage ($V_2$).

In an embodiment, the power supply circuit 210 may include multiple switches. An operation of the multiple switches included in the power supply circuit 210 may be controlled based on a signal of the switch control circuit 230. For example, the multiple switches included in the power supply circuit 210 may be turned on or turned off, based on a signal of the switch control circuit 230.

In an embodiment, the power supply circuit 210 may generate the first voltage ($V_1$), the second voltage ($V_2$), and the third voltage ($V_3$) by the multiple switches being turned on and/or turned off, based on a signal of the switch control circuit 230.

In an embodiment, the first power circuit 211 may be a three-level boost circuit having multiple outputs. In an embodiment, the second power circuit 212 may be a buck-boost circuit.

In an embodiment, the first voltage ($V_1$) and the second voltage ($V_2$) may have almost equal absolute values, and have different polarities. For example, the first voltage ($V_1$) may be 4.6 [V] and the second voltage ($V_2$) may be −4.4 [V].

In an embodiment, the regulator 220 may include at least one regulator. The regulator 220 may include at least one low dropout (LDO) regulator. The regulator 220 may adjust a voltage transferred from the power supply circuit 210, and use an output voltage to supply a power to a different device in the electronic device 101.

In an embodiment, the regulator 220 may adjust a voltage level of the third voltage ($V_3$) provided from the power supply circuit 210, and use an output voltage to supply a power to a different device in the electronic device 101.

In an embodiment, the regulator 220 may adjust a voltage level of the third voltage ($V_3$) provided from the power supply circuit 210, and use an output voltage to supply multiple powers to a different device in the electronic device 101.

In an embodiment, the switch control circuit 230 may generate signals for controlling the multiple switches included in the power supply circuit 210.

In an embodiment, the switch control circuit 230 may be, for example, a pulse width modulation (PWM).

Figure 3:
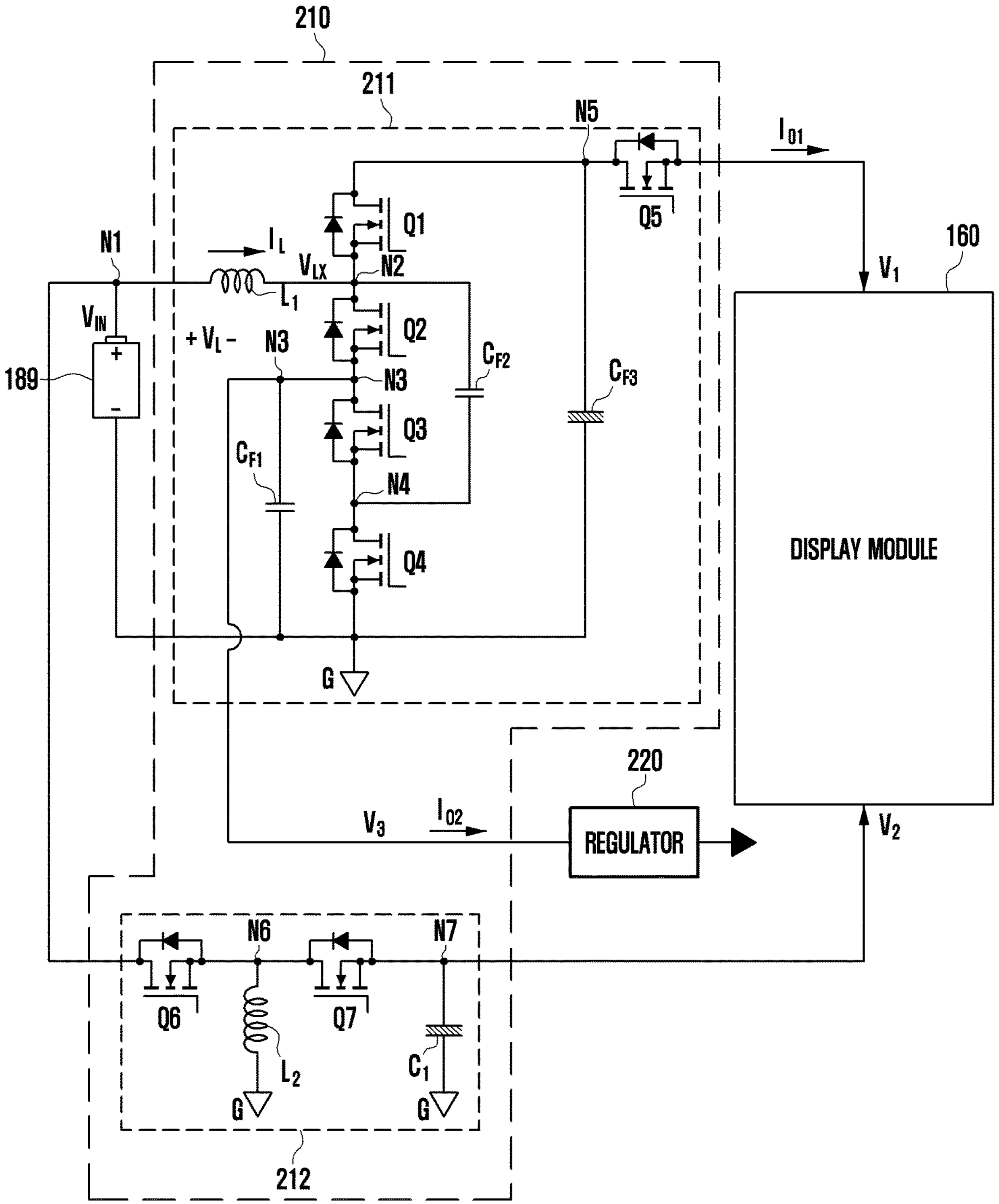
FIG. 3 is a circuit diagram illustrating a circuitry configuration of an electronic device including a power supply circuit according to various embodiments.

FIG. 3 is a circuit diagram illustrating a circuitry configuration of the electronic device 101 including the power supply circuit 210 according to various embodiments.

In an embodiment, the electronic device 101 may include all or at least some of the elements of the electronic device 101 as described in the description given with reference to FIG. 1 or FIG. 2.

Referring to FIG. 3, the electronic device 101 may include the display module (e.g., including a display) 160, the battery 189, the power supply circuit 210, and/or the regulator 220.

In an embodiment, the display module 160 may include, for example, an organic light emitting diode (OLED) panel.

In an embodiment, the battery 189 may be connected between a first node N1 and a ground G. The battery 189 may provide an input voltage $V_{IN}$ to the first node N1.

In an embodiment, the power supply circuit 210 may include the first power circuit 211 and the second power circuit 212.

In an embodiment, the first power circuit 211 may include multiple switches Q1, Q2, Q3, Q4, and Q5, multiple capacitors $C_{F1}$, $C_{F2}$, and $C_{F3}$, and a first inductor $L_1$.

In an embodiment, the first power circuit 211 may be a three-level boost circuit having multiple outputs.

In an embodiment, the first power circuit 211 may be connected between the first node N1 and the display module 160. The input voltage $V_{IN}$ may be transferred to the first power circuit 211.

In an embodiment, the first power circuit 211 may change a voltage level of the input voltage $V_{IN}$, and provide a first voltage $V_1$ to the display module 160.

In an embodiment, the first power circuit 211 may change a voltage level of the input voltage $V_{IN}$, to generate the first voltage $V_1$.

In an embodiment, the first power circuit 211 may provide the first voltage $V_1$ to a power line of the OLED panel.

In an embodiment, the first power circuit 211 may change a voltage level of the input voltage $V_{IN}$, to generate a third voltage $V_3$.

In an embodiment, the first inductor $L_1$ may be connected between the first node N1 and a second node N2. The first switch Q1 may be connected between the second node N2 and a fifth node N5. The second switch Q2 may be connected between the second node N2 and a third node N3. The third switch Q3 may be connected between the third node N3 and a fourth node N4. The fourth switch Q4 may be connected between the fourth node N4 and the ground G. The fifth switch Q5 may be connected between the fifth node Q5 and the display module 160.

In an embodiment, the fifth switch Q5 may be connected between the fifth node Q5 and the power line of the OLED panel.

In an embodiment, the regulator 220 may be connected to the third node N3 of the first power circuit 211. In an embodiment, the regulator 220 may receive a voltage output from the third node N3 of the first power circuit 211.

In an embodiment, the first capacitor $C_{F1}$ may be connected between the third node N3 and the ground G. The second capacitor $C_{F2}$ may be connected between the second node N2 and the fourth node N4. The third capacitor $C_{F3}$ may be connected between the fifth node N5 and the ground G.

In an embodiment, the second capacitor $C_{F2}$ may operate as a flying capacitor of the three-level boost circuit.

In an embodiment, each of the multiple switches Q1, Q2, Q3, Q4, and Q5 of the first power circuit 211 may use a transistor (e.g., a metal-oxide-semiconductor field-effect transistor (MOSFET)).

Multiple drive signals generated by the switch control circuit 230 may be input to gate drivers of the respective multiple switches Q1, Q2, Q3, Q4, and Q5. The multiple switches Q1, Q2, Q3, Q4, and Q5 may be turned on or turned off, based on multiple drive signals input to respective gates, to change a voltage level of the input voltage $V_{IN}$ to generate the first voltage $V_1$ and the third voltage $V_3$.

For example, when a logic level of multiple drive signals is a high level (H) or 1, the multiple switches Q1, Q2, Q3, Q4, and Q5 may be turned on and a current may flow according to a gate-source voltage difference. When a logic level of multiple drive signals is a low level (L) or 0, the multiple switches Q1, Q2, Q3, Q4, and Q5 may be turned off and a current flow may be blocked.

In the disclosure, a description is given mainly for the feature wherein, when a logic level of multiple drive signals is a high level (H) or 1, the multiple switches Q1, Q2, Q3, Q4, and Q5 are turned on, and when a logic level of multiple drive signals is a low level (L) or 0, the multiple switches Q1, Q2, Q3, Q4, and Q5 are turned off. However, the opposite operation is also possible in various embodiments.

In various embodiments, when a logic level of multiple drive signals is a low level (L) or 0, the multiple switches Q1, Q2, Q3, Q4, and Q5 included in the first power circuit 211 may be turned on and a current may flow according to a gate-source voltage difference. When a logic level of multiple drive signals is a high level (H) or 1, the multiple switches Q1, Q2, Q3, Q4, and Q5 included in the first power circuit 211 may be turned off and a current flow may be blocked.

In an embodiment, the first power circuit 211 may receive a first drive signal, a second drive signal, a third drive signal, a fourth drive signal, and a fifth drive signal from the switch control circuit 230. The first drive signal may be input to the gate of the first switch Q1. The second drive signal may be input to the gate of the second switch Q2. The third drive signal may be input to the gate of the third switch Q3. The fourth drive signal may be input to the gate of the fourth switch Q4. The fifth drive signal may be input to the gate of the fifth switch Q5.

In an embodiment, the second power circuit 212 may include multiple switches Q6 and Q7, a second inductor $L_2$, and a capacitor $C_1$.

In an embodiment, the second power circuit 212 may be a buck-boost circuit.

In an embodiment, the second power circuit 212 may be connected between the first node N1 and the display module 160. The second power circuit 212 may receive the input voltage $V_{IN}$ via the battery 189 connected to the first node N1.

In an embodiment, the second power circuit 212 may change a voltage level of the input voltage $V_{IN}$, to generate a second voltage $V_2$.

In an embodiment, the second power circuit 212 may provide the second voltage $V_2$ to the display module 160.

In an embodiment, the second power circuit 212 may provide the second voltage $V_2$ to a cathode of an OLED element included in the display module 160.

In an embodiment, the six switch Q6 may be connected between the first node N1 and a sixth node N6. The seventh switch Q7 may be connected between the six node N6 and a seventh node N7.

In an embodiment, the cathode of the OLED element included in the display module 160 may be connected to the seventh node N7.

In an embodiment, the second inductor $L_2$ may be connected between the sixth node N6 and a ground G. The capacitor $C_1$ may be connected between the seventh node N7 and a ground G.

In an embodiment, each of the multiple switches Q6 and Q7 of the second power circuit 212 may use a transistor (e.g., a metal-oxide-semiconductor field-effect transistor (MOSFET)).

Multiple drive signals generated by the switch control circuit 230 may be input to gate drivers of the respective multiple switches Q6 and Q7. The multiple switches Q6 and Q7 may be turned on or turned off, based on multiple drive signals input to respective gates, to change a voltage level of the input voltage $V_{IN}$ to generate the second voltage $V_2$.

In an embodiment, the sixth switch Q6 and the seventh switch Q7 included in the second power circuit 212 may operate, based on a drive signal generated by the switch control circuit 230.

For example, a drive signal input to the sixth switch Q6 may include a sixth drive signal, and a drive signal input to the seventh switch Q7 may include a seventh drive signal.

For example, when a logic level of multiple drive signals is a high level (H) or 1, the multiple switches Q6 and Q7 may be turned on and a current may flow according to a gate-source voltage difference. When a logic level of multiple drive signals is a low level (L) or 0, the multiple switches Q6 and Q7 may be turned off and a current flow may be blocked.

In the disclosure, a description is given mainly for the feature wherein, when a logic level of multiple drive signals is a high level (H) or 1, the multiple switches Q6 and Q7 are turned on, and when a logic level of multiple drive signals is a low level (L) or 0, the multiple switches Q6 and Q7 are turned off. However, the opposite operation is also possible in various embodiments.

In various embodiments, when a logic level of multiple drive signals is a low level or 0, the multiple switches Q6 and Q7 included in the second power circuit 212 may be turned on and a current may flow according to a gate-source voltage difference. When a logic level of multiple drive signals is a high level or 1, the multiple switches Q6 and Q7 included in the second power circuit 212 may be turned off and a current flow may be blocked.

In an embodiment, the second power circuit 212 may receive the sixth drive signal and the seventh drive signal from the switch control circuit 230. The sixth drive signal may be input to the gate of the sixth switch Q6. The seventh drive signal may be input to the gate of the seventh switch Q7.

In an embodiment, the switch control circuit 230 may transmit, to the second power circuit 212, the sixth drive signal, the logic level of which is a high level (H) or 1, and the seventh drive signal, the logic level of which is a low level (L) or 0. The sixth switch Q6 may be turned on according to the sixth drive signal, and the seventh switch Q7 may be turned off according to the seventh drive signal.

In an embodiment, when the sixth switch Q6 is turned on and the seventh switch Q7 is turned off, the second inductor $L_2$ may accumulate energy, based on the input voltage $V_{IN}$. When the sixth switch Q6 is turned on and the seventh switch Q7 is turned off, the capacitor $C_1$ may be discharged to provide the second voltage $V_2$ to the display module 160.

In an embodiment, when the sixth switch Q6 is turned off and the seventh switch Q7 is turned on, the capacitor $C_1$ may be charged. When the sixth switch Q6 is turned off and the seventh switch Q7 is turned on, the second inductor $L_2$ may provide the accumulated energy to the display module 160 as the second voltage $V_2$.

In an embodiment, the switch control circuit 230 may adjust times for which the sixth switch Q6 and the seventh switch Q7 are turned on or turned off. The second power circuit 212 may output the second voltage $V_2$, based on a ratio of the times for which the sixth switch Q6 and the seventh switch Q7 are turned on or turned off.

Figure 4:
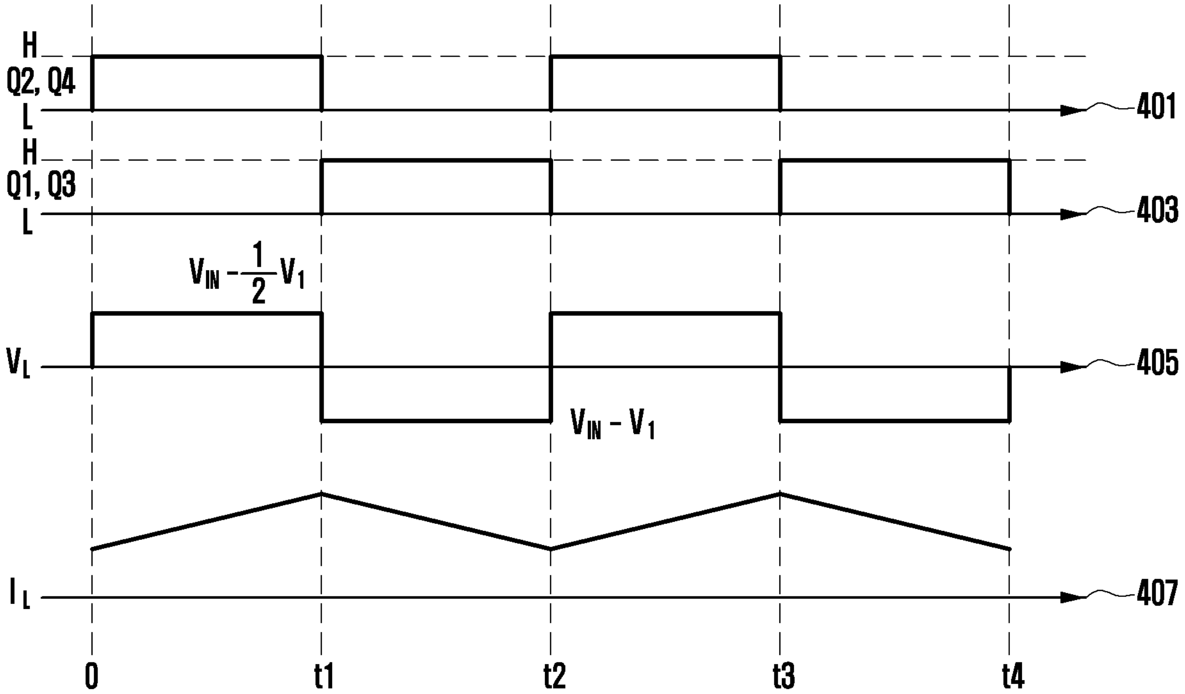
FIG. 4 includes graphs illustrating the voltage and the current of both ends of a first inductor according to an operation of a first power circuit according to various embodiments.

FIG. 4 includes graphs illustrating the voltage and the current of both ends of the first inductor $L_1$ according to an operation of the first power circuit 211 according to various embodiments.

In graph 401, the first power circuit 211 may simultaneously turn on or turn off the second switch Q2 and the fourth switch Q4 according to multiple drive signals output from the switch control circuit 230.

In graph 403, the first power circuit 211 may simultaneously turn on or turn off the first switch Q1 and the third switch Q3 according to multiple drive signals output from the switch control circuit 230.

For example, in a 0-t1 interval and a t2-t3 interval, when the second switch Q2 and the fourth switch Q4 are simultaneously turned on according to multiple drive signals output from the switch control circuit 230, the first power circuit 211 may simultaneously turn off the first switch Q1 and the third switch Q3.

In graph 405, when the second switch Q2 and the fourth switch Q4 are simultaneously turned on, and the first switch Q1 and the third switch Q3 are simultaneously turned off (e.g., the 0-t1 interval and the t2-t3 interval), the voltage of the second node N2 and the third node N3 may be the half ($\frac{1}{2} \times V_1$) of the first voltage $V_1$ due to the first capacitor $C_{F1}$ and the second capacitor $C_{F2}$ connected in parallel. The voltage $V_L$ of both ends of the first inductor $L_1$ may be $V_{IN}-\frac{1}{2} \times V_1$.

In graph 407, when the second switch Q2 and the fourth switch Q4 are simultaneously turned on, and the first switch Q1 and the third switch Q3 are simultaneously turned off (e.g., the 0-t1 interval and the t2-t3 interval), the voltage of the first capacitor $C_{F1}$ and the second capacitor $C_{F2}$ is $\frac{1}{2} \times V_1$ and is smaller than the first voltage $V_1$. Therefore, the current $I_L$ of the first inductor $L_1$ increases linearly.

For example, in a t1-t2 interval and a t3-t4 interval, when the second switch Q2 and the fourth switch Q4 are simultaneously turned off according to multiple drive signals output from the switch control circuit 230, the first power circuit 211 may simultaneously turn on the first switch Q1 and the third switch Q3.

In graph 405, when the first switch Q1 and the third switch Q3 are simultaneously turned on, and the second switch Q2 and the fourth switch Q4 are simultaneously turned off (e.g., the t1-t2 interval and the t3-t4 interval), the first capacitor $C_{F1}$ and the second capacitor $C_{F2}$ are connected in series, and thus the voltage of the second node N2 may be the same as the first voltage $V_1$. The voltage $V_L$ of both ends of the first inductor $L_1$ may be $V_{IN}-V_1$.

In graph 407, when the first switch Q1 and the third switch Q3 are simultaneously turned on, and the second switch Q2 and the fourth switch Q4 are simultaneously turned off (e.g., the t1-t2 interval and the t3-t4 interval), the voltage $V_L$ of both ends of the first inductor $L_1$ is smaller than the first voltage $V_1$. Therefore, the current $I_L$ of the first inductor $L_1$ decreases linearly.

Figure 5:
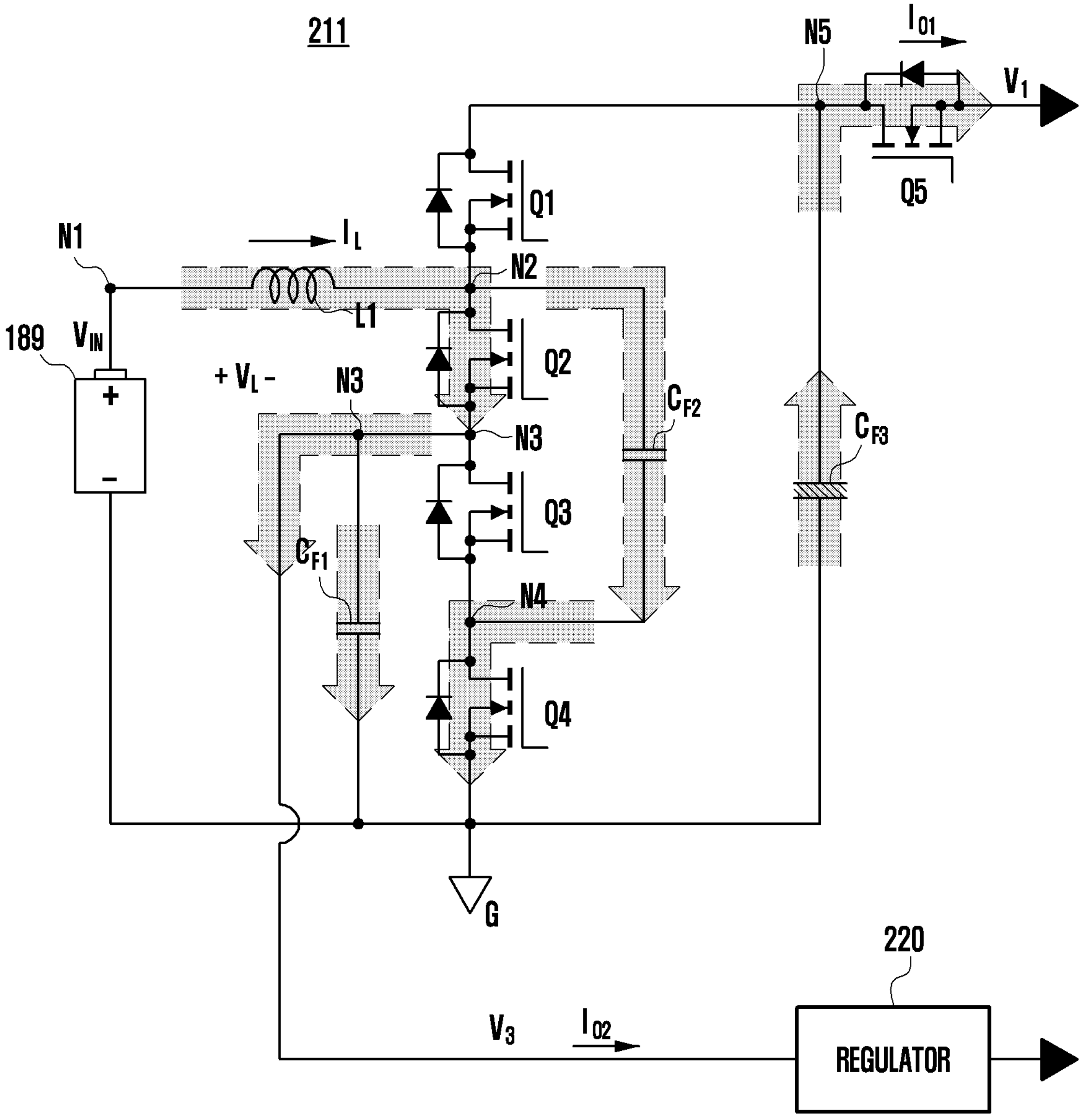
FIG. 5 is a circuit diagram illustrating a first operation of a first power circuit according to various embodiments.

FIG. 5 is a circuit diagram illustrating an example first operation of the first power circuit 211 according to various embodiments.

Referring to FIG. 3, FIG. 4, and FIG. 5, the first operation of the first power circuit 211 will be described in greater detail below.

For example, in the 0-t1 interval and the t2-t3 interval, when the second switch Q2 and the fourth switch Q4 are simultaneously turned on according to multiple drive signals output from the switch control circuit 230, the first power circuit 211 may simultaneously turn off the first switch Q1 and the third switch Q3. The fifth switch Q5 may be turned on, based on a fifth drive signal output from the switch control circuit 230.

In an embodiment, when the second switch Q2 and the fourth switch Q4 are simultaneously turned on, and the first switch Q1 and the third switch Q3 are simultaneously turned off (e.g., the 0-t1 interval and the t2-t3 interval), the voltage of the second node N2 and the third node N3 may be the half ($\frac{1}{2} \times V_1$) of the first voltage $V_1$ due to the first capacitor $C_{F1}$ and the second capacitor $C_{F2}$ connected in parallel. The voltage $V_L$ of both ends of the first inductor $L_1$ may be $V_{IN}-\frac{1}{2} \times V_1$.

In an embodiment, when the second switch Q2 and the fourth switch Q4 are simultaneously turned on, and the first switch Q1 and the third switch Q3 are simultaneously turned off (e.g., the 0-t1 interval and the t2-t3 interval), the first capacitor $C_{F1}$ and the second capacitor $C_{F2}$ may be charged with at least a part of the current $I_L$ of the first inductor $L_1$, and at least a part thereof may be supplied as a second output current $I_{O2}$. The second output current $I_{O2}$ may be supplied to the regulator 220. A voltage level of the third voltage $V_3$ may be the same as $\frac{1}{2} \times V_1$, which is a voltage level of the third node N3.

In an embodiment, when the second switch Q2 and the fourth switch Q4 are simultaneously turned on, and the first switch Q1 and the third switch Q3 are simultaneously turned off (e.g., the 0-t1 interval and the t2-t3 interval), the third capacitor $C_{F3}$ may be discharged to provide a first output current $I_{O1}$ to the display module 160.

Figure 6:
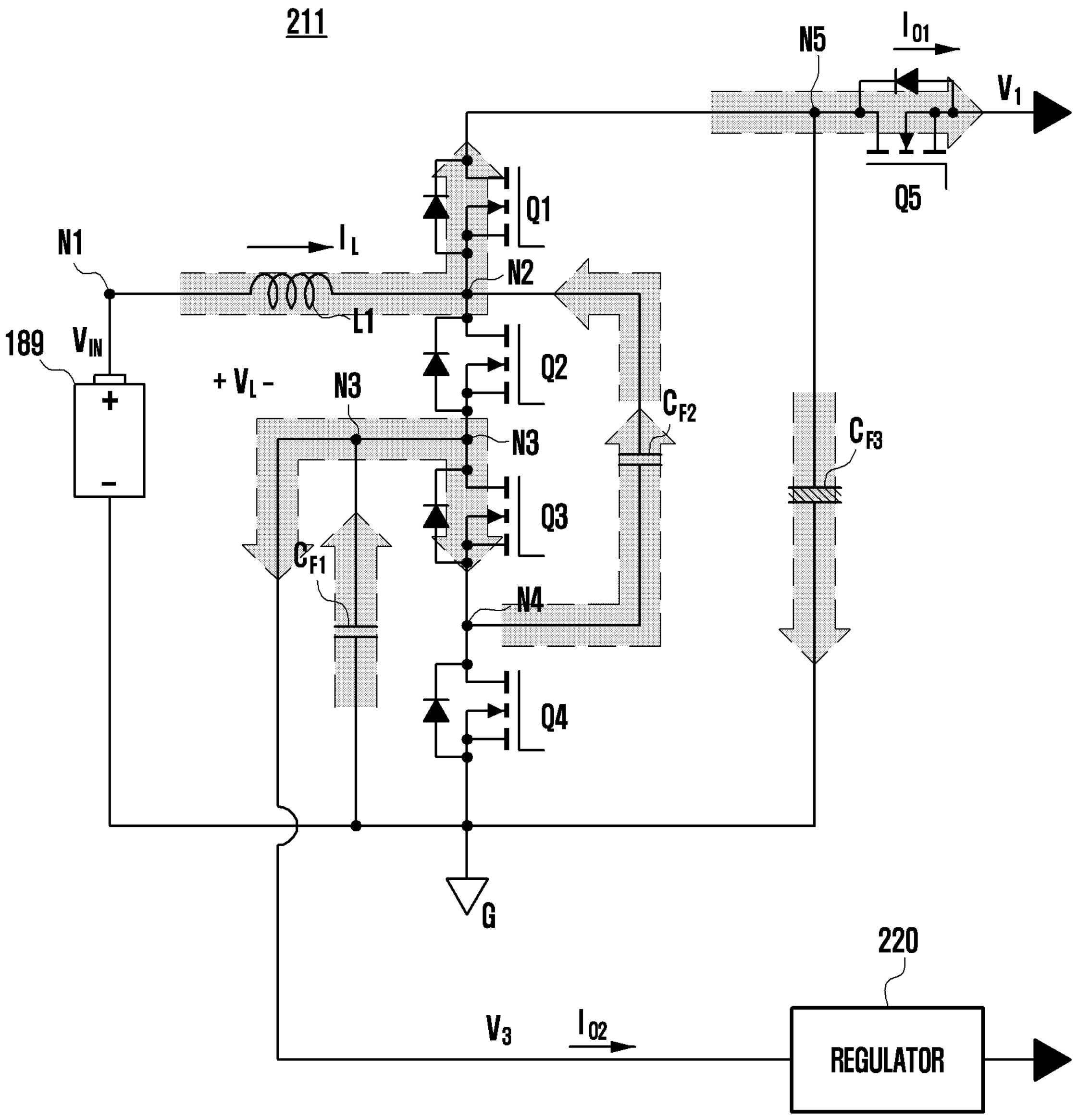
FIG. 6 is a circuit diagram illustrating a second operation of a first power circuit according to various embodiments.

FIG. 6 is a circuit diagram illustrating an example second operation of the first power circuit 211 according to various embodiments.

Referring to FIG. 3, FIG. 4, and FIG. 6, the second operation of the first power circuit 211 will be described as below.

For example, in the t1-t2 interval and the t3-t4 interval, when the second switch Q2 and the fourth switch Q4 are simultaneously turned off according to multiple drive signals output from the switch control circuit 230, the first power circuit 211 may simultaneously turn on the first switch Q1 and the third switch Q3. The fifth switch Q5 may be turned on, based on a fifth drive signal output from the switch control circuit 230.

In an embodiment, when the first switch Q1 and the third switch Q3 are simultaneously turned on, and the second switch Q2 and the fourth switch Q4 are simultaneously turned off (e.g., the t1-t2 interval and the t3-t4 interval), the first capacitor $C_{F1}$ and the second capacitor $C_{F2}$ are connected in series, and thus the voltage of the second node N2 may be the same as the first voltage $V_1$. The voltage $V_L$ of both ends of the first inductor $L_1$ may be $V_{IN}-V_1$.

In an embodiment, when the first switch Q1 and the third switch Q3 are simultaneously turned on, and the second switch Q2 and the fourth switch Q4 are simultaneously turned off (e.g., the t1-t2 interval and the t3-t4 interval), at least a part of the current $I_L$ of the first inductor $L_1$ may be introduced to the third capacitor $C_{F3}$. The third capacitor $C_{F3}$ may be charged based on the current $I_L$ of the first inductor $L_1$. At least a part of the current $I_L$ of the first inductor $L_1$ may be supplied as a first output current $I_{O1}$. The third voltage $V_3$ may be ½×$V_1$, which is the voltage of the third node N3. The first capacitor $C_{F1}$ and the second capacitor $C_{F2}$ may be discharged to supply a second output current $I_{O2}$.

A conventional three-level boost converter may provide one output power, based on one input power. In comparison with this, the first power circuit 211 according to the disclosure may provide multiple output powers, based on one input power. The first power circuit 211 according to the disclosure may provide multiple output powers without addition of a converter circuit.

In an embodiment, the power supply circuit 210 and/or the first power circuit 211 may output the first voltage $V_1$ and the third voltage $V_3$, based on one input voltage $V_{IN}$.

In an embodiment, the power supply circuit 210 and/or the first power circuit 211 may output the first output current $I_{O1}$ and the second output current $I_{O2}$, based on one input voltage $V_{IN}$.

A conventional three-level boost converter is required to include at least two switch elements (e.g., transistors) in an inductor current path to provide an output voltage or an output current. In comparison with this, the first power circuit 211 according to the disclosure has an advantage of reducing conduction loss in that only one switch element (e.g., a transistor) is always involved in an inductor (the first inductor $L_1$) current path when an output voltage (e.g., the first voltage $V_1$ and the third voltage $V_3$) or an output current (e.g., the first output current $I_{O1}$ and the second output current $I_{O2}$) is provided to the display module 160 or the regulator 220.

In an embodiment, when a duty rate of the second switch Q2 and the fourth switch Q4 is D, a duty rate of the first switch Q1 and the third switch Q3 may be 1−D. An input/output voltage ratio based on a duty rate for an operation of the multiple switches Q1, Q2, Q3, and Q4 may be as shown in Equation 1. The input/output voltage ratio may be calculated using a steady state condition allowing a value obtained by integrating the voltage of both ends of the first inductor $L_1$ for one period to be 0.

$$\left(V_{IN} - \frac{1}{2}V_O\right)D = (V_0 - V_{IN})(1 - D) \Leftrightarrow \frac{V_O}{V_{IN}} = \frac{2}{2 - D} \quad \text{[Equation 1]}$$

The input voltage $V_{IN}$ of Equation 1 may be the input voltage $V_{IN}$ of the first power circuit 211, and the output voltage $V_O$ of Equation 1 may be the first voltage $V_1$ of the first power circuit 211.

Referring to Equation 1, the first power circuit 211 of the disclosure may have an input/output voltage ratio between 1 and 2.

For example, the first power circuit 211 may supply power to the OLED panel having a drive voltage of 4.6 V, based on the voltage of the battery 189, which is 3 V-4.5 V. In addition, the voltage of the first capacitor $C_{F1}$ is always maintained as ½ of an output voltage (e.g., the first voltage $V_1$), and thus a 2.3 V voltage may be provided to the regulator 220.

The switch control circuit 230 (e.g., PWM) may control an output voltage, based on an output voltage (e.g., the first voltage $V_1$) generated by a duty rate of the second switch Q2 and the fourth switch Q4, or a duty rate of the first switch Q1 and the third switch Q3. The switch control circuit 230 (e.g., PWM) may change a voltage level of an output voltage (e.g., the first voltage V1) by adjusting a duty rate of the second switch Q2 and the fourth switch Q4, or a duty rate of the first switch Q1 and the third switch Q3.

The electronic device including the power supply circuit according to various embodiments of the disclosure may include: a battery; a display module including a display; a regulator; a power supply circuit configured to: based on an input voltage of the battery, provide a first voltage and a second voltage to the display module, and provide a third voltage to the regulator; and the switch control circuit configured to control a switching operation of the power supply circuit, wherein the power supply circuit includes a first power circuit and a second power circuit, wherein the first power circuit includes multiple switch elements, a first capacitor, a second capacitor, a third capacitor, and a first inductor, and is configured to: for a first time interval, based on a drive signal of the switch control circuit, charge the first capacitor and the second capacitor, based on a current of the first inductor and discharge the third capacitor to provide a first output current to the display module, and for a second time interval, based on a drive signal of the switch control circuit, charge the third capacitor and discharge the first capacitor and the second capacitor to provide the first output current and a second output current to the display module, and wherein the second power circuit is configured to convert a voltage level of the input voltage of the battery to provide a second voltage to the display module.

The first inductor according to various example embodiments of the disclosure may be configured to provide at least a part of a current of the first inductor for the first time interval as the second output current, and provide at least a part of a current of the first inductor for the second time interval as the first output current.

The battery according to various example embodiments of the disclosure may be connected between a first node and a ground, and the first power circuit may be connected between the first node and the display module.

The first inductor according to various example embodiments of the disclosure is connected between the first node and a second node, and the electronic 101 includes: a first switch connected between the second node and a fifth node; a second switch connected between the second node and a third node; a third switch connected between the third node and a fourth node; a fourth switch connected between a fourth node and the ground; and a fifth switch connected between a fifth node and the display module.

The switch control circuit according to various example embodiments of the disclosure may be configured to: control the first switch and the third switch to be simultaneously turned off when the second switch and the fourth switch are simultaneously turned on, and control the first switch and the third switch to be simultaneously turned on when the second switch and the fourth switch are simultaneously turned off.

When the second switch and the fourth switch according to various example embodiments of the disclosure are simultaneously turned on, and the first switch and the third switch are simultaneously turned off, a voltage of the first inductor may be obtained by subtracting a half of the first voltage from the input voltage.

When the second switch and the fourth switch according to various example embodiments of the disclosure are simultaneously turned on, and the first switch and the third switch are simultaneously turned off, a current of the first inductor may increase linearly.

When the second switch and the fourth switch according to various example embodiments of the disclosure are simultaneously turned off, and the first switch and the third switch are simultaneously turned on, a voltage of the first inductor may be obtained by subtracting the first voltage from the input voltage.

When the second switch and the fourth switch according to various example embodiments of the disclosure are simultaneously turned on, and the first switch and the third switch are simultaneously turned off, a current of the first inductor may decrease linearly.

The switch control circuit according to various example embodiments of the disclosure may be configured to: change a voltage level of the first voltage by adjusting a duty rate of the second switch and the fourth switch or a duty rate of the first switch and the third switch.

The electronic device according to various example embodiments of the disclosure may further include: a processor; and a memory, wherein the processor is configured to: control the switch control circuit, based on data related to a switch operation of the power supply circuit stored in the memory.

The second power circuit according to various example embodiments of the disclosure may be connected between the first node and the display module.

The second power circuit according to various example embodiments of the disclosure may include: a sixth switch connected between the first node and a sixth node; the seventh switch connected between the sixth node and a seventh node; a second inductor connected between the sixth node and the ground; and a capacitor connected between the seventh node and the ground, and the display module may be connected to the seventh node.

The switch control circuit according to various example embodiments of the disclosure may be configured to control the seventh switch to be turned off when the sixth switch is turned on, and control the seventh switch to be turned on when the sixth switch is turned off.

When the sixth switch according to various example embodiments of the disclosure is turned on and the seventh switch is turned off, the second inductor may accumulate energy, based on the input voltage, and the capacitor may provide a second voltage to the display module.

When the sixth switch according to various example embodiments of the disclosure is turned off and the seventh switch is turned on, the capacitor may be charged, and the second inductor may provide accumulated energy to the display module as the second voltage.

The regulator according to various example embodiments of the disclosure may include at least one low dropout (LDO) regulator.

The regulator according to various example embodiments of the disclosure may be configured to adjust a voltage level of a third voltage to supply multiple output voltages to a different device in the electronic device.

The display module according to various example embodiments of the disclosure may include an organic light emitting diode (OLED) panel.

The first power circuit according to various example embodiments of the disclosure may be configured to provide the first voltage to the OLED panel as a positive voltage, and the second power circuit may be configured to provide the second voltage to the OLED panel as a negative voltage.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “a first”, “a second”, “the first”, and “the second” may be used to simply distinguish a corresponding element from another, and does not limit the elements in other aspect (e.g., importance or order). It is to be understood that if an element (e.g., a first element) is referred to, with or without the term “operatively” or “communicatively”, as “coupled with/to” or “connected with/to” another element (e.g., a second element), the element may be coupled/connected with/to the other element directly (e.g., wiredly), wirelessly, or via a third element.

As used herein, the term “module” may include a unit implemented in hardware, software, or firmware, or any combination thereof, and may be interchangeably used with other terms, for example, “logic,” “logic block,” “component,” or “circuit”. The “module” may be a minimum unit of a single integrated component adapted to perform one or more functions, or a part thereof. For example, according to an embodiment, the “module” may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities mat be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a battery;

a display;

a power circuit configured to provide a first voltage to the display based on an input voltage of the battery; and a switch control circuit configured to control a switching operation of the power circuit, wherein the power circuit comprises:

a first inductor connected between a first node and a second node of the power circuit, wherein the battery is connected between the first node and a ground of the power circuit;

a first switch connected between the second node and a fifth node of the power circuit;

a second switch connected between the second node and a third node of the power circuit;

a third switch connected between the third node and a fourth node of the power circuit;

a fourth switch connected between the fourth node of the power circuit and a ground of the electronic device;

a fifth switch connected between the fifth node of the power circuit and the display;

a first capacitor connected between the third node of the power circuit and the ground of the electronic device;

a second capacitor connected between the second node and the fourth node of the power circuit; and a third capacitor connected between the fifth node of the power circuit and the ground of the electronic device, wherein the switch control circuit is configured to:

for a first time interval, control the first switch and the third switch to be simultaneously turned off when the second switch, the fourth switch and the fifth switch are simultaneously turned on; and for a second time interval, control the first switch, the third switch and the fifth switch to be simultaneously turned on when the second switch and the fourth switch are simultaneously turned off.

2. The electronic device of claim 1, wherein the power circuit is configured to:

for the first time interval, charge the first capacitor and the second capacitor based on a current of the first inductor and discharge the third capacitor to provide a first output current to the display.

3. The electronic device of claim 1, wherein, for the first time interval, a current of the first inductor increases linearly.

4. The electronic device of claim 1, wherein, for the first time interval, a voltage of the first inductor is a half of the first voltage subtracted from the input voltage.

5. The electronic device of claim 1, wherein, for the first time interval, a voltage of the second node and a voltage of the third node are a half of the first voltage.

6. The electronic device of claim 1, wherein the power circuit is configured to:

for the second time interval, charge the third capacitor and discharge the first capacitor and the second capacitor to provide a second output current to the display.

7. The electronic device of claim 1, wherein, for the second time interval, a current of the first inductor decreases linearly.

8. The electronic device of claim 1, wherein, for the second time interval, a voltage of the first inductor is the first voltage subtracted from the input voltage.

9. The electronic device of claim 1, wherein, for the second time interval, a voltage of the second node is the same as the first voltage.

10. The electronic device of claim 1, further comprises a regulator, wherein the regulator is connected to the third node and comprises at least one low dropout (LDO) regulator.

11. The electronic device of claim 10, wherein the regulator is configured to adjust a voltage level of a voltage of the node third to supply multiple output voltages to a different device in the electronic device.

12. The electronic device of claim 1, wherein the display comprises an organic light emitting diode (OLED) panel.

13. The electronic device of claim 12, wherein the power circuit is configured to provide the first voltage to the OLED panel as a positive voltage.

* * * * *